United States Patent [19]

Schilling et al.

[11] Patent Number: 5,535,238
[45] Date of Patent: *Jul. 9, 1996

[54] SPREAD SPECTRUM ADAPTIVE POWER CONTROL COMMUNICATIONS SYSTEM AND METHOD

[75] Inventors: Donald L. Schilling, Sands Point, N.Y.; Joseph Garodnick, Centerville, Mass.; Gary Lomp, Centerport; Timothy F. Moore, III, New York, both of N.Y.

[73] Assignee: InterDigital Technology Corporation, Wilmington, Del.

[*] Notice: The term of this patent shall not extend beyond the expiration date of Pat. No. 5,093,840.

[21] Appl. No.: 218,198

[22] Filed: Mar. 28, 1994

Related U.S. Application Data

[63] Continuation-in-part of Ser. No. 792,869, Nov. 19, 1991, Pat. No. 5,299,226.

[51] Int. Cl.⁶ .................................................. H04Q 7/00
[52] U.S. Cl. .......................... 375/200; 375/349; 455/33.1; 455/61; 455/213
[58] Field of Search ..................................... 375/200, 102; 380/34; 455/33.1, 59, 61, 103, 191, 212, 213; 379/59, 63

[56] References Cited

U.S. PATENT DOCUMENTS

| | | | |
|---|---|---|---|
| 3,838,342 | 9/1974 | Bjorkman | 325/32 |
| 4,193,031 | 3/1980 | Cooper | 455/38 |
| 4,222,115 | 9/1980 | Cooper et al. | 375/1 |
| 4,484,335 | 11/1984 | Mosley et al. | 375/1 |
| 4,538,280 | 8/1985 | Mosley, Jr. et al. | 375/1 |

(List continued on next page.)

FOREIGN PATENT DOCUMENTS 2229609  2/1990  United Kingdom .

OTHER PUBLICATIONS

R. F. Ormondroyd, "Power Control for Spread–Spectrum Systems," Conference on Communications Equipment and Systems; 20–22 Apr. 1982, pp. 109–115.

Munday & Pinches, "Jaquar–V frequency–hopping radio system," 8:49 IEEE Proceedings Section A–K, vol. 129 (1982), Jun., No. 3, Part F, Oldwoking, Surrey, Great Britain.

Nettleton, Raymond W.; Spectral Efficiency in Cellular Land–Mobile Communications: A Spread–Spectrum Approach (1978) (unpublished Ph.D. dissertation, Purdue University).

Cooper, George R. and Nettleton, Ray W., "Cellular Mobile Technology: The Great Multiplier," *IEEE Spectrum*, Jun. 1983, pp. 30–37.

Blasbalg, H., "A Comparison of Pseudo–Noise and Conventional Modulation for Multiple–Access Satellite Communications," *IBM Journal of Research and Development*, vol. 9, No. 4, Jul. 1965, p. 241–255.

(List continued on next page.)

*Primary Examiner*—David C. Cain
*Attorney, Agent, or Firm*—David Newman & Associates

[57] ABSTRACT

A system and method for adaptive-power control of a spread-spectrum transmitter of a mobile station operating in a cellular-communications network using spread-spectrum modulation. A mobile station transmits a first spread-spectrum signal. A base station has an automatic-gain-control circuit for generating an AGC-output signal, from a received signal. The received signal includes the first spread-spectrum signal and an interfering signal. The base station also has a correlator for despreading the AGC-output signal, a power-measurement circuit responsive to processing the received signal with the despread AGC-output signal for generating a received-power level, a comparator coupled to the power-measurement circuit for generating a comparison signal by comparing the received-power level to a threshold level, a transmitter for transmitting a second spread-spectrum signal, and an antenna. The mobile station has a variable-gain device responsive to the comparison signal for adjusting a transmitter-power level of the first spread-spectrum signal.

21 Claims, 11 Drawing Sheets

U.S. PATENT DOCUMENTS

| | | | |
|---|---|---|---|
| 4,672,658 | 6/1987 | Kavehrad et al. | 379/63 |
| 4,843,612 | 6/1989 | Brusch et al. | 375/1 |
| 4,899,364 | 2/1990 | Akazawa et al. | 375/1 |
| 4,901,307 | 2/1990 | Gilhousen et al. | 370/18 |
| 4,958,359 | 9/1990 | Kato | 375/1 |
| 5,056,109 | 10/1991 | Gilhousen et al. | 375/1 |
| 5,093,840 | 3/1992 | Schilling | 375/200 |
| 5,101,501 | 3/1992 | Gilhousen et al. | 455/33 |
| 5,103,459 | 4/1992 | Gilhousen et al. | 375/1 |
| 5,109,390 | 4/1992 | Gilhousen et al. | 375/1 |
| 5,257,283 | 10/1993 | Gilhousen et al. | 375/200 |
| 5,265,119 | 11/1993 | Gilhousen et al. | 375/1 |
| 5,267,262 | 11/1993 | Wheatley, III | 375/200 |
| 5,299,226 | 3/1994 | Schilling | 380/34 X |
| 5,386,588 | 1/1995 | Yasuda | 455/33.1 |

OTHER PUBLICATIONS

Dixon, Robert C., *Spread Spectrum Systems* (John Wiley & Sons Inc.: New York, 3d ed. 1994), pp. 412–413.

*The International Dictionary of Physics and Electronics* (D. Van Nostrand Co.: Princeton, NJ, 2d. ed. 1961) pp. 612, 952.

Robinson, Vester, *Solid–State Circuit Analysis* (Reston Publishing Co.: Reston, VA, 1975) pp. 309–314.

Alavi; Hossein, Power Control and Interference Management in a Spread–Spectrum Cellular Mobile Radio System (1984) (unpublished Ph.D. dissertation, Michigan State University).

SPREAD SPECTRUM ADAPTIVE POWER CONTROL COMMUNICATIONS SYSTEM AND METHOD

RELATED APPLICATIONS

This application is a continuation-in-part of application 07/792,869, filed Nov. 19,1991, now U.S. Pat. No. 5,299,226.

BACKGROUND OF THE INVENTION

This invention relates to spread-spectrum communications, and more particularly to an apparatus and method for adaptive power control of spread-spectrum signal in a cellular, personal communications environment.

DESCRIPTION OF THE PRIOR ART

A spread-spectrum signal typically is generated by modulating an information-data signal with a chip-code signal. The information-data signal may come from a data device such as a computer, or an analog device which outputs an analog signal which has been digitized to an information-data signal, such as voice or video. The chip-code signal is generated by a chip-code where the time duration, Tc, of each chip is substantially less than a data bit or data symbol.

Spread-spectrum modulation provides means for communicating in which a spread-spectrum signal occupies a bandwidth in excess of the minimum bandwidth necessary to send the same information. The band spread is accomplished using a chip code which is independent of an information-data signal. A synchronized reception with the chip-code at a receiver is used for despreading the spread-spectrum signal and subsequent recovery of data from the spread-spectrum signal.

Spread-spectrum modulation offers many advantages as a communications system for an office or urban environment. These advantages include reducing intentional and unintentional interference, combating multipath problems, and providing multiple access to a communications system shared by multiple users. Commercially, these applications include, but are not limited to, local area networks for computers and personal communications networks for telephone, as well as other data applications.

A cellular communications network using spread-spectrum modulation for communicating between a base station and a multiplicity of users, requires control of the power level of a particular mobile user station. Within a particular cell, a mobile station near the base station of the cell may be required to transmit with a power level less than that when the mobile station is near an outer perimeter of the cell. This is done to ensure a constant power level at the base station, received from each mobile station.

In a first geographical region, such as an urban environment, the cellular architecture within the first geographical region may have small cells which are close to each other, requiring a low power level from each mobile user. In a second geographical region, such as a rural environment, the cellular architecture within the region may have large cells which are spread apart, requiring a relatively high power level from each mobile user. A mobile user who moves from the first geographical region to the second geographical region typically adjusts the power level of his transmitter, for meeting the requirements of a particular geographic region. Otherwise, if the mobile user traveled from a sparsely populated region with fewer spread out cells using the relatively higher power level with his spread-spectrum transmitter, to a densely populated region with many cells, without reducing the power level of his spread-spectrum transmitter, his spread-spectrum transmitter may cause undesirable interference within the cell in which he is located and/or to adjacent cells. Also, if a mobile user moves behind a building and has his signal to the base station blocked by the building, then the mobile user's power level should be increased. And doing this quickly, with high dynamic range and in a manner to ensure an almost constant received power level with low root mean square error and peak deviations from this constant level.

Accordingly, there is a need to have a spread-spectrum system and method for automatically controlling a mobile user's spread-spectrum transmitter power level when operating in a cellular communications network.

SUMMARY OF THE INVENTION

A general object of the invention is a system and method which results in maximization of user density within a cell domain while minimizing mobile user transmitted power.

An object of the invention is to provide an apparatus and method which controls the power level of a mobile station so that the power level received at the base station of each cell is the same for each mobile station.

Another object of the invention is to provide a system and method for automatically and adaptively controlling the power level of a mobile user in a cellular communications network.

A further object of the invention is to provide a spread-spectrum system and method which allows operating a spread-spectrum transmitter in different geographic regions, wherein each geographic region has a multiplicity of cells, and cells within a geographic region may have different size cells and transmitter power requirements.

According to the present invention, as embodied and broadly described herein, a system for adaptive-power control (APC) of a spread-spectrum transmitter is provided. A plurality of mobile stations operate in a cellular-communications network using spread-spectrum modulation. A mobile station transmits a first spread-spectrum signal. The base station transmits a second spread-spectrum signal.

The base station includes automatic gain control (AGC) means, base-correlator means, power means, transmitter means, and an antenna. The base-correlator means is coupled to the AGC means. The power means is coupled to the base-correlator means and to the comparator means. The comparator means is coupled to the power means. The antenna is coupled to the transmitter means.

Each mobile station includes despreading means and variable-gain means.

A received signal is defined herein to include the first spread-spectrum signal and an interfering signal. The interfering signal is defined herein to include a noise and/or other spread-spectrum signals and/or other undesirable signals which are coexistent in frequency with the first spread-spectrum signal.

For each received signal, the AGC means generates an AGC-output signal. The base-correlator means despreads the AGC-output signal. The power means processes the received signal for generating a received-power level. Alternatively, the power means processes the received signal with the despread AGC-output signal for generating a received-power level. The power means generates a power-command signal by comparing the received-power level to a threshold level. The power-command signal may be an analog or digital data signal, or a data signal multiplexed with information data bits. The transmitter means at the base station transmits the power-command signal as the second spread-spectrum signal or as a data signal multiplexed with the information data bits.

At each mobile station, the mobile-despreading means despreads the power-command signal from the second spread-spectrum signal, as a power-adjust signal. The variable-gain means uses the power-adjust signal as a basis for adjusting a transmitter-power level of the first spread-spectrum signal transmitted from the mobile-station transmitter. The transmitter-power level may be adjusted linearly or nonlinearly.

The present invention also includes a method for automatic-power control of a spread-spectrum transmitter for a mobile station operating in a cellular-communications network using spread-spectrum modulation. A mobile station transmits a first spread-spectrum signal. The base station performs the steps of acquiring the first spread-spectrum signal transmitted from the mobile station, and detecting a received power level of the first spread-spectrum signal plus any interfering signal including noise. The steps also include generating an AGC-output signal from the received signal, and despreading the AGC-output signal. The despread AGC-output signal is processed to generate a received-power level. The despread AGC-output signal optionally may be processed with the received signal to generate a received-power level. The method further includes comparing the received-power level to the threshold level to generate a power-command signal. The power-command signal is transmitted from the base station as part of the second spread-spectrum signal.

At the mobile station the method despreads the power-command signal from the second spread-spectrum signal, and adjusts a transmitter power level of the first spread-spectrum signal in response to the power-command signal.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Figure 1:
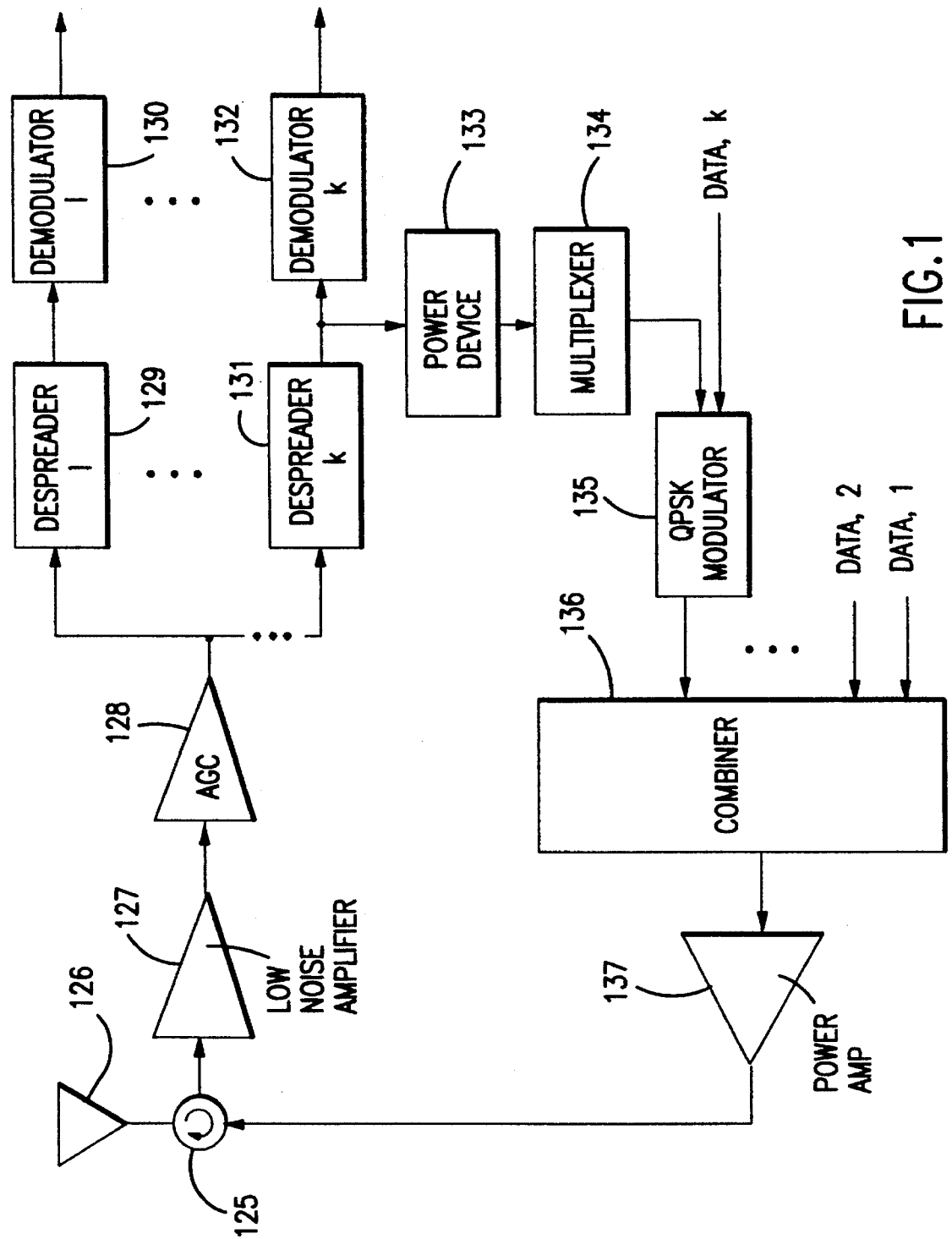
FIG. 1 is a block diagram of a base station.

Reference now is made in detail to the present preferred embodiments of the invention, examples of which are illustrated in the accompanying drawings, wherein like reference numerals indicate like elements throughout the several views.

The present invention assumes that a plurality of mobile stations operate in a cellular-communications network using spread-spectrum modulation. The cellular communications network has a plurality of geographical regions, with a multiplicity of cells within a geographical region. The size of the cells in a first geographical region may differ from the size of the cells in a second geographical region. In a first geographical region such as an urban environment, a cellular architecture within the region may have a large number of cells of small area which are close to each other. In a second geographical region such as a rural environment, a cellular architecture within the region may have cells of larger area. Further, within a specified geographic region, the size of the cells may vary.

A mobile station while in the first geographical region may be required to transmit a lower power level than while in the second geographical region. This requirement might be due to a decreased range of the mobile station from the base station. Within a particular cell, a mobile station near the base station of the cell may be required to transmit with a power level less than that when the mobile station is near an outer perimeter of the cell. This is done to ensure a constant power level at the base station, received from each mobile station.

For discussion purposes, a mobile station within a particular cell transmits a first spread-spectrum signal, and the base station transmits a second spread-spectrum signal.

In the exemplary arrangement shown in FIG. 1, a block diagram of a base station as part of a system for adaptive-power control of a spread-spectrum transmitter is provided. The base station comprises automatic-gain-control (AGC) means, base-correlator means, power means, transmitter means, and an antenna 126. The AGC means is coupled between the antenna 126 and the base-correlator means. The power means is coupled between the base-correlator means and the transmitter means. The transmitter means is coupled to the antenna 126.

A received signal at the AGC means typically includes all of the incoming spread spectrum signals, unwanted interfering signals and thermal noise. The AGC means generates an AGC-output signal from the received signal.

The AGC-output signal is passed to the base-correlator means. The base-correlator means despreads the AGC-output signal as a despread AGC-output signal. The power means processes the AGC-output signal as a received-power level. In response to comparing the received-power level to a threshold, the power means generates a power-command signal. The power-command signal is transmitted by the transmitter means as a second spread-spectrum signal to the mobile station.

The power-command signal indicates whether the mobile station is to increase or decrease its power level. The determination of whether to increase or decrease the power level is made by comparing the received-power level to the threshold. If the received-power level exceeded the threshold, then the power-command signal sends a message to the mobile station to decrease its transmitter power. If the received-power level were below the threshold, then the power-command signal sends a message to the mobile station to increase its transmitter power.

The power-command signal may be transmitted with or separate from the second spread-spectrum signal. For example, a spread-spectrum signal using a first chip sequence may be considered a first spread-spectrum channel, and a spread-spectrum signal using a second chip sequence may be considered a second spread-spectrum channel. The power-command signal may be transmitted in the same spread-spectrum channel, i.e., the first spread-spectrum channel, as the second spread-spectrum signal, or in a second spread-spectrum channel which is different from the second spread-spectrum signal.

The base-correlator means is depicted in FIG. 1 as despreader k 131. The system, by way of example, may have the base-correlator means embodied as a product device, a chip-sequence generator, and a bandpass filter. Alternatively, the base-correlator means may be realized as a matched filter such as a surface-acoustic-wave device. In general, the base-correlator means uses or is matched to the chip sequence of the spread-spectrum signal being received. Correlators and matched filters for despreading a spread-spectrum signal are well known in the art.

Typically, the AGC circuit 128 is coupled to a low noise amplifier 127, through an isolator 125 to the antenna 126. In FIG. 1 a plurality of despreaders, despreader 129 through despreader 131, are shown for despreading a plurality of spread spectrum channels, which may be received from a plurality of mobile stations. Similarly, the output of each despreader 129 through despreader 131 is coupled to a plurality of demodulators, demodulator 130 through demodulator 132, respectively, for demodulating data from the despread AGC-output signal. Accordingly, a plurality of data outputs are available at the base station.

For a particular $k^{th}$ spread-spectrum channel, despreader 131 is shown coupled to power device 133 and multiplexer 134. The power device 133 typically is a power-measurement circuit which processes the despread AGC-output signal as a received-power level. The power device 133 might include an analog-to-digital converter circuit for outputting a digital received-power level. The power device 133 also may include a comparator circuit for comparing the received-power level to a threshold. The multiplexer 134 is coupled to the output of the power device 133. The multiplexer 134 may insert appropriate framing bits, as required.

The transmitter means is embodied as a quadrature phase shift keying (QPSK) modulator 135 coupled to a power amplifier 137. In FIG. 1, the input to the QPSK modulator 135 typically would have the power-command signal from the power device 133 multiplexed with data from the $k^{th}$ channel. A plurality of spread spectrum channels would have their data and appropriate power-command signals combined by combiner 136 and amplified by power amplifier 137. The output of the power amplifier 137 is coupled through the isolator 125 to antenna 126.

The power command signal is transmitted periodically. The period T is chosen typically to be 250 microseconds in order to ensure a low root mean square error as well as a low peak error between the instantaneous received signal and the constant desired signal.

Figure 2:
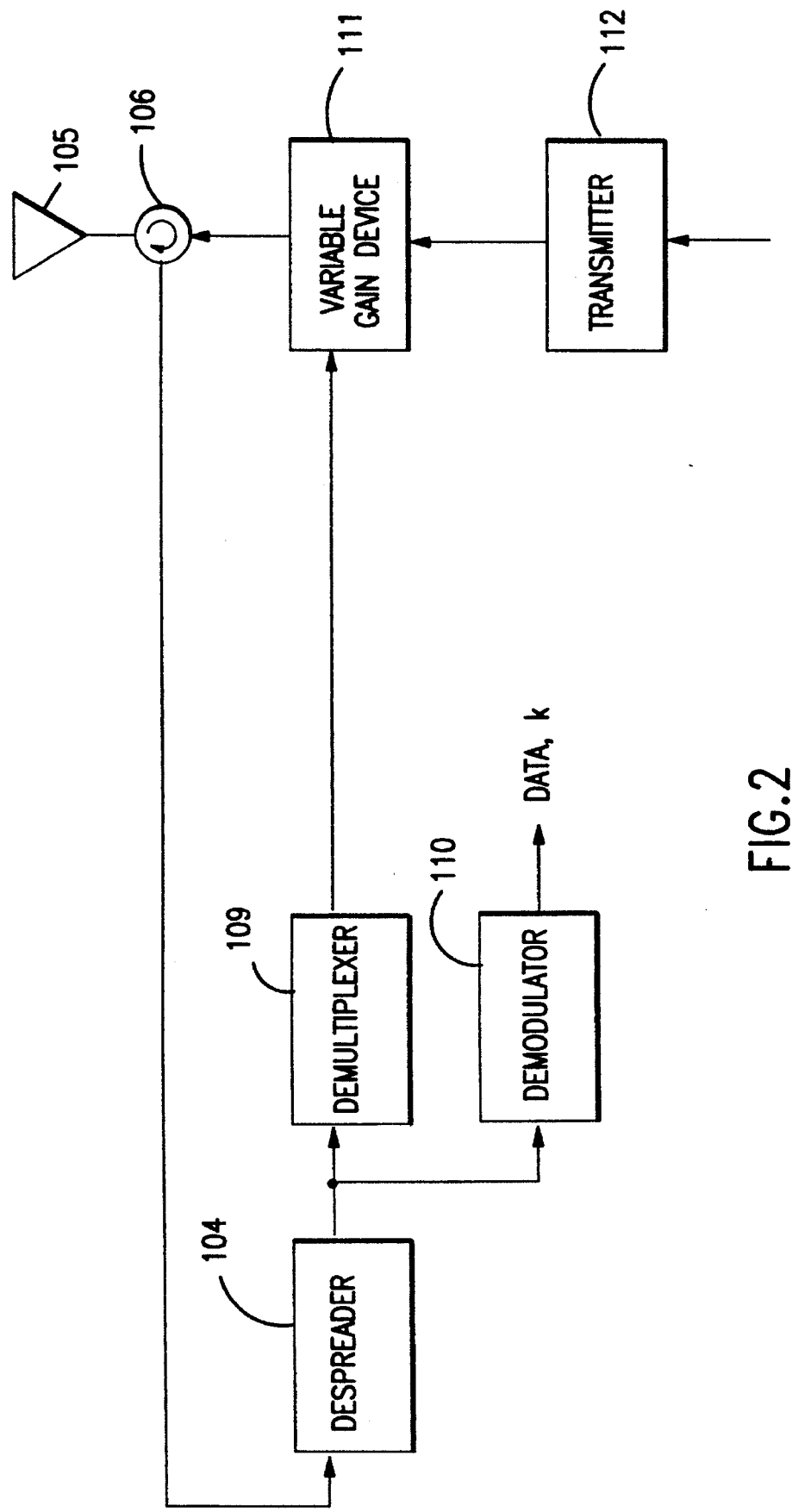
FIG. 2 is a block diagram of a mobile station.

A mobile station illustratively is shown in FIG. 2. The mobile-despreading means is illustrated as despreader 104 and variable-gain means is illustrated as a variable-gain device 111. The variable-gain device 111 is coupled between the transmitter 112 and through isolator 106 to antenna 105. The despreader 104 is coupled to the isolator 106 and to demultiplexer 109. The output of the despreader 104 is also coupled to a demodulator 110. The despreader 104 may be embodied as appropriate correlator, or match filter, for despreading the $k^{th}$ channel. Additional circuitry may be used, such as radio frequency (RF) amplifiers and filters, intermediate frequency (IF) amplifiers and filters, as is well known in the art.

A received second spread-spectrum signal at antenna 105 passes through isolator 106 to despreader 104. The despreader 104 is matched to the chip sequence of the desired $k^{th}$ spread-spectrum channel. The output of the despreader 104 passes through the demodulator 110 for demodulating the data from the $k^{th}$ channel. Additionally, the demultiplexer 109 demultiplexes the power-command signal from the despread signal outputted from despreader 104. The power-command signal drives variable-gain device 111.

The variable-gain device 111 may be embodied as a variable-gain amplifier, a variable-gain attenuator, or any device which performs the same function as the variable-gain device 111 as described herein. The variable-gain device 111 increases or decreases the power level of the remote station transmitter, based on the power-command signal.

Figure 3:
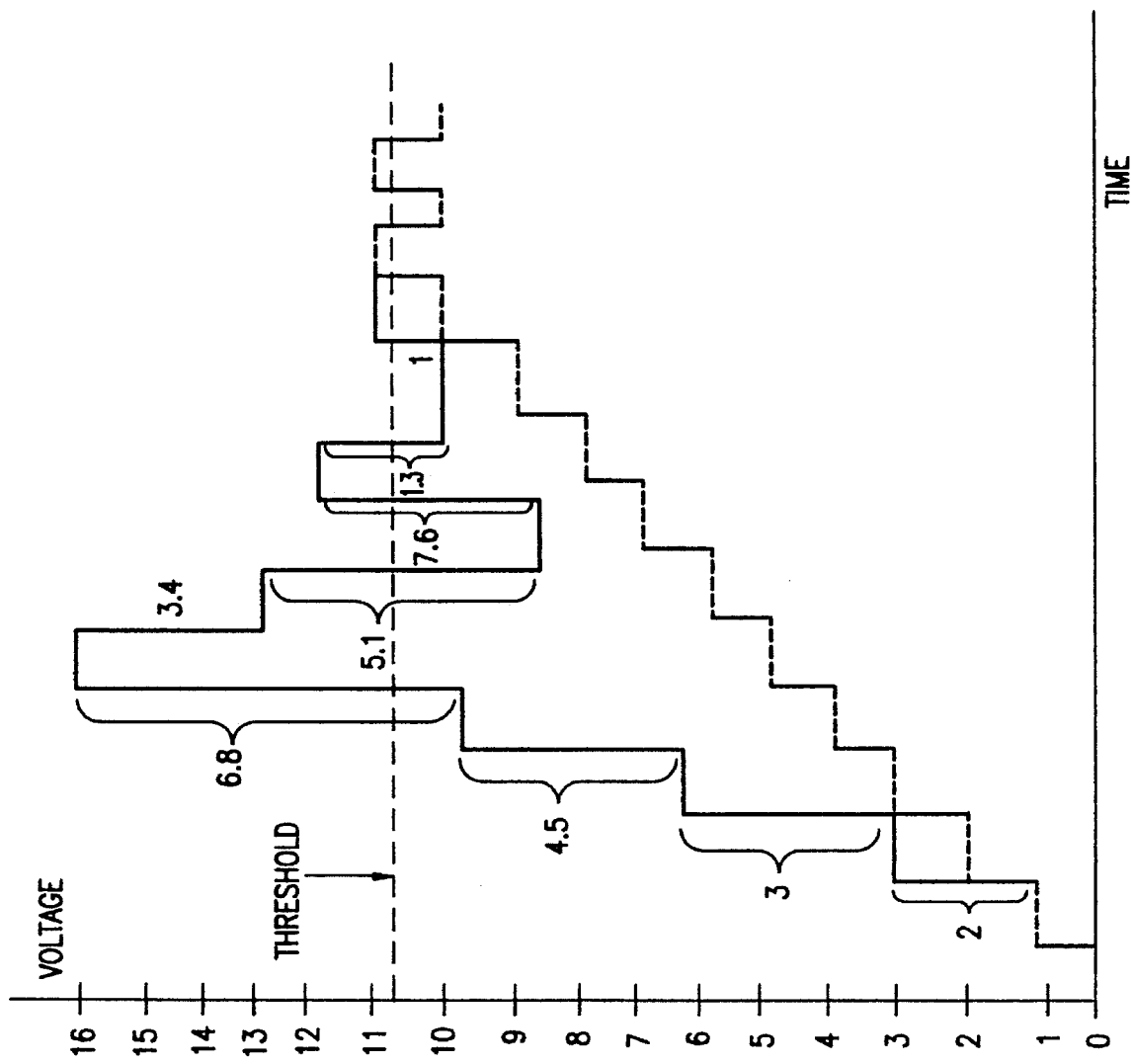
FIG. 3 illustrates linear and nonlinear power adjustment.

Adjustment of the power level of the remote station transmitter may be effected either linearly or nonlinearly. As illustrated in FIG. 3, to increase the power level using linear adjustment, for example, the transmitter power is increased in regular increments of one volt, or other unit as instructed by the base station, until the power level received at the base station is sufficiently strong. Linear adjustment may be time consuming if the power adjustment necessary were substantial.

Figure 4:
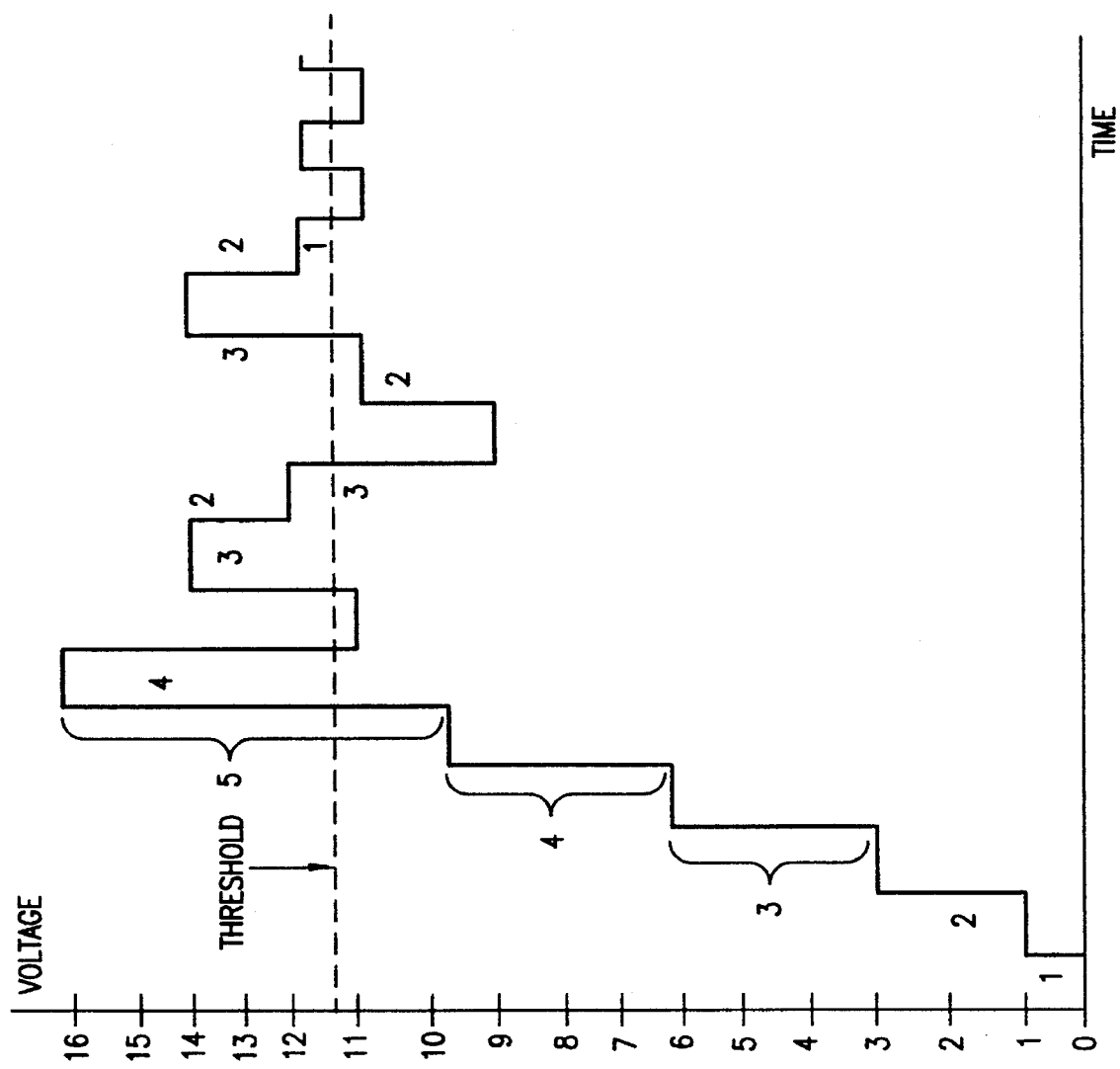
FIG. 4 illustrates nonlinear power adjustment.

As shown in FIG. 3, to increase the power using nonlinear adjustment, the transmitter voltage may be increased, by way of example, geometrically until the transmitted power is in excess of the desired level. Transmitter power may be then reduced geometrically until transmitted power is below the desired level. A preferred approach is to increase the step size voltage by a factor of 1.5 and to decrease the step size by a factor of 0.5. Other nonlinear algorithms may be used. As shown in FIG. 4, this process is repeated, with diminishing margins of error in both excess and insufficiency of desired power, until the desired signal level has been obtained. Nonlinear adjustment provides a significantly faster rise and fall time than does linear adjustment, and may be preferable if power must be adjusted significantly.

Figure 5:
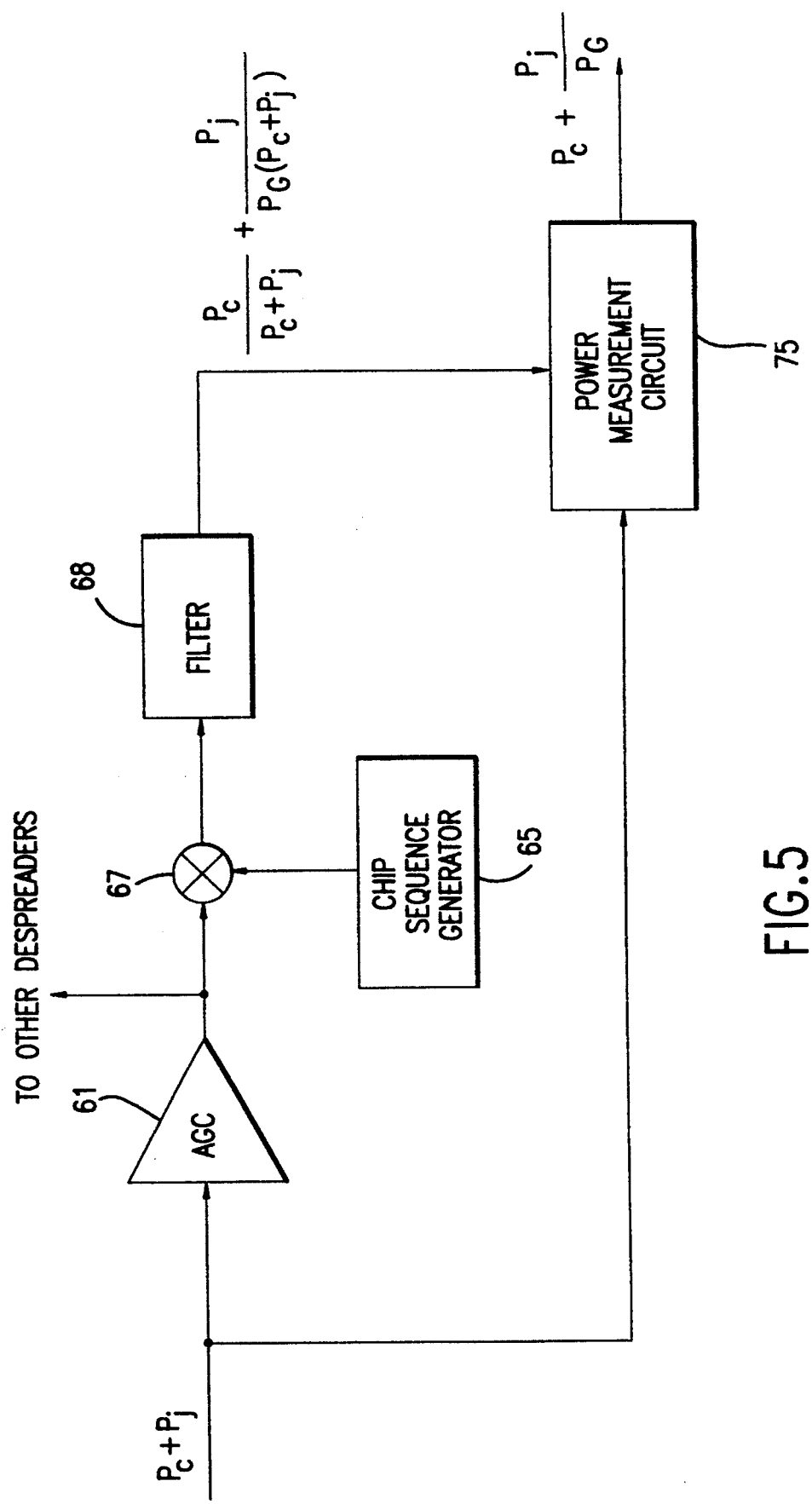
FIG. 5 is a block diagram for an interference rejection circuit.

As illustratively shown in FIG. 5, a block diagram of a power measurement circuit with interference rejection is shown for use with the base station. A correlator is shown with the mixer 67 coupled between the chip-sequence generator 65, and filter 68. Additionally, AGC means and power means are included. The AGC means is embodied as an automatic-gain-control (AGC) circuit 61, and the power means is embodied as a power measurement circuit 75. As shown in FIG. 5, the AGC circuit 61 is connected to the mixer 67, and the output of the filter 68 is connected to the power measurement circuit 75. Additionally, the input to the AGC circuit 61 is connected to the power measurement circuit 75.

A received signal includes a first spread-spectrum signal with power $P_C$ and the other input signals which are considered to be interfering signals with power $P_J$ at the input to the circuit of FIG. 5. The interfering signal may come from one or more nondesirable signals, noise, multipath signals, and any other source which would serve as an interfering signal to the first spread-spectrum signal. The received signal is normalized by the AGC circuit 61. Thus, by way of example, the AGC circuit 61 can have the power output, $P_C+P_I=1$. The normalized received signal is despread by the correlator to receive a particular mobile user's signal, which in this case is shown by way of example as the mixer 67, chip-code generator 65 and filter 68. The chip-code generator 65 generates a chip-sequence signal using the same chip-sequence as the first spread-spectrum signal. The despread signal is filtered by filter 68, and the output of the filter 68 is the normalized power of the first spread-spectrum signal plus the normalized power of the interfering signal divided by the processing gain, PG, of the spread-spectrum system. The power measurement circuit 75 can process the despread-received signal with the received signal and output the received-power level of the first spread-spectrum signal. The power level of the interfering signal is reduced by the processing gain, PG.

The power measurement circuit 75 can process the received signal with the despread, normalized received signal by multiplying the two signals together, or by logarithmically processing the received signal with the despread received signal. In the latter case, the logarithm is taken of the power of the received signal, $P_C+P_I$, and the logarithm is taken of the despread, normalized received signal. The two logarithms are added together to produce the received-power level.

A key element for the present invention to work is to keep almost constant the despread signal, independently of variations of the other signals or of obstructions. A preferred implementation to accomplish this end is shown in the circuitry of FIG. 5. FIG. 5 shows a way for determining at the base station the power of the first spread-spectrum signal when the received signal includes multiple signals and noise. If the circuitry of FIG. 5 were not used, then it is possible that the interfering signal, which may include noise, multipath signals, and other undesirable signals, may raise the power level measured at the input to the receiver of the base station, thereby suppressing the first spread spectrum signal. The undesirable power level measured may cause the remote station to transmit more power than required, increasing the amount of power received at the base station.

Figure 6:
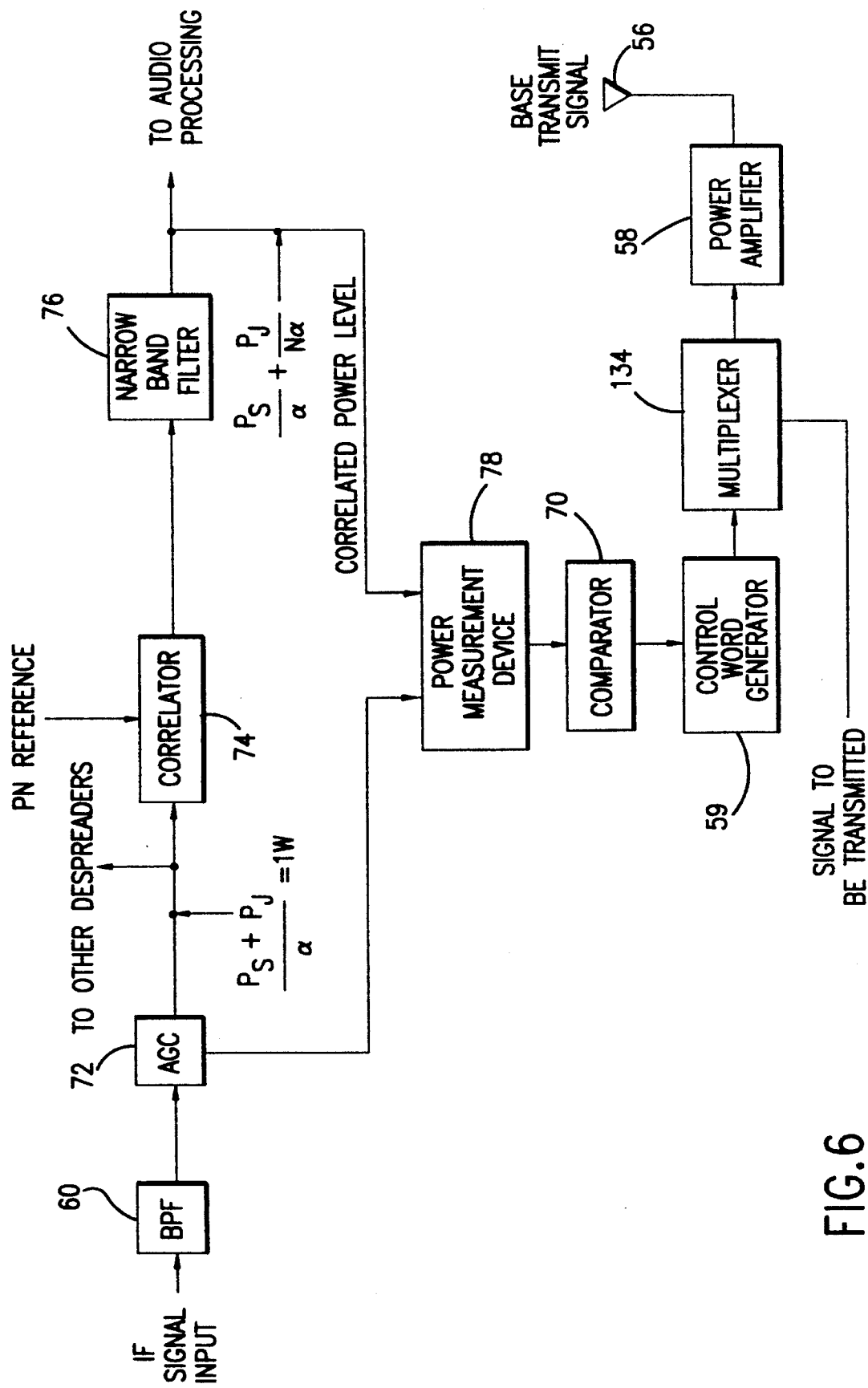
FIG. 6 is a block diagram of a base station with interference rejection.

FIG. 6 illustrates the base station automatic power control circuit of FIG. 1, with the concepts from FIG. 5 added thereto. Shown in FIG. 6 are automatic gain control (AGC) means, power means, comparator means, transmitter means, and an antenna. The AGC means is shown as an automatic-gain-control (AGC) amplifier 72, correlator means is shown as correlator 74 with filter 76, and power means is shown as power measurement device 78. The comparator means is shown as comparator 70, the transmitter means is shown as power amplifier 58 coupled to the antenna 56. Also illustrated is a control word generator 59 coupled between comparator 70 and power amplifier 58.

The AGC amplifier 72 is coupled between the bandpass filter 60 and the correlator 74. The filter 76 is coupled to the output of the correlator 74. The power measurement device 78 is coupled to the AGC amplifier 72 and the filter 76. The comparator 70 is coupled to the output of the power measurement device 78 and to the control word generator 59. The multiplexer 134 is coupled between the control word generator 59 and the power amplifier 58. The control word generator 59 is coupled between the comparator 70 and the multiplexer 134. The power amplifier 58 is coupled to the antenna 56.

A threshold level is used by the comparator 70 as a comparison for the received-power level measured by the power measurement device 78.

For each received signal, the AGC amplifier 72 generates an AGC-output signal. The AGC-output signal is despread to obtain the signal of user one using correlator 74 and filter 76. The despread-AGC-output signal from the filter 76 is processed with the received signal from the AGC amplifier 72, by the power measurement device 78. The received signal to the power measurement device 78 may be a AGC-control-voltage level from the AGC amplifier 72.

The power measurement device 78 processes the received signal with the despread-AGC-output signal, for generating a received-power level. As mentioned previously for FIG. 1, the power measurement device can process the received signal with the despread-AGC-output signal by multiplying the two signals together, or by logarithmically processing the received signal with the despread-AGC-output signal.

The comparator 70 generates a comparison signal by comparing the received-power level generated by the power measurement device 78, to the threshold level. The comparison signal may be an analog or digital data signal. Broadly, the control word generator 59 can convert the comparison signal to a digital data signal, i.e., the power-command signal, for controlling the variable-gain device 111 of FIG. 2. The variable-gain device 111 uses the power-command signal, as processed by the control word generator 59, as a basis for adjusting a transmitter-power level of the first spread-spectrum signal transmitted by the mobile station.

In operation, a mobile station in a cell may transmit the first spread-spectrum signal on a continuous basis or on a repetitive periodic basis. The base station within the cell receives the first spread-spectrum signal. The received first spread-spectrum signal is acquired and despread with the chip-sequence signal from chip-sequence generator and product device. The despread first spread-spectrum signal is filtered through bandpass filter. The base station detects the despread first spread-spectrum signal using envelope detector, and measures or determines the received-power level of the first spread-spectrum signal. The base station generates the power-command signal from the received-power level.

The power-command signal may be transmitted on the same channel as the second spread-spectrum signal using the same chip sequence as the second spread-spectrum signal. In this case, the power-command signal is transmitted at a different time interval from when the second spread-spectrum signal is transmitted. This format allows the mobile station to acquire synchronization with the first sequence, using the second spread-spectrum signal.

As an alternative, the power-command signal may be transmitted on a different coded channel using a second chip sequence. In the latter case, the second spread-spectrum signal having the power-command signal would be acquired by the second chip-code generator and second product device. In either case, the power-command signal is demultiplexed using demultiplexer 109. Further, the power-command signal may be time division multiplexed or frequency division multiplexed with the second spread-spectrum signal.

The present invention also includes a method for automatic-power control of a spread-spectrum transmitter for a mobile station operating in a cellular-communications network using spread-spectrum modulation, with the mobile station transmitting a first spread-spectrum signal. In use, the method includes the step of receiving a received signal, generating an AGC-output signal, despreading the AGC-output signal, processing the despread AGC-output signal to generate a received-power level, generating a power-command signal, transmitting the power-command signal as a second spread-spectrum signal, despreading the power-command signal from the second spread-spectrum signal as a power-adjust signal, and adjusting a power level of the first spread-spectrum signal.

The received signal includes the first spread-spectrum signal and an interfering signal and is received at the base station. The AGC-output signal is generated at the base station and despread as a despread AGC-output signal. The despread AGC-output signal is processed at the base station to generate a received-power level.

The received-power level is compared to a threshold, with the comparison used to generate a power-command signal. If the received-power level were greater than the threshold, the power-command signal would command the mobile station to reduce transmitter power. If the received-power level were less than the threshold, the power-command signal would command the mobile station to increase transmitter power.

The power-command signal is transmitted from the base station to the mobile station as a second spread-spectrum signal. Responsive to receiving the second spread-spectrum signal, the mobile station despreads the power-command signal as a power-adjust signal. Depending on whether the power-command signal commanded the mobile station to increase or decrease transmitter power, the mobile station, responsive to the power adjust signal, increases or decreases the transmitter-power level of the first spread-spectrum signal, respectively.

The method may additionally include generating from a received signal an AGC-output signal, and despreading the AGC-output signal. The received signal includes the first spread-spectrum signal and an interfering signal. The received signal is processed with the despread AGC-output signal to generate a received-power level. The method then generates a comparison signal by comparing the received-power level to the threshold level. While transmitting a second spread-spectrum signal, the method adjusts a transmitter-power level of the first spread-spectrum signal from the transmitter using the power-adjust signal.

PERFORMANCE OF THE INVENTION

A spread spectrum base station receives all incoming signals simultaneously. Thus, if a signal were received at a higher power level than the others, then that signal's receiver has a higher signal-to-noise ratio and therefore a lower bit error rate. The base station ensures that each mobile station transmits at the correct power level by telling the remote, every 500 microseconds, whether to increase or to decrease the mobile station's power.

Figure 7:
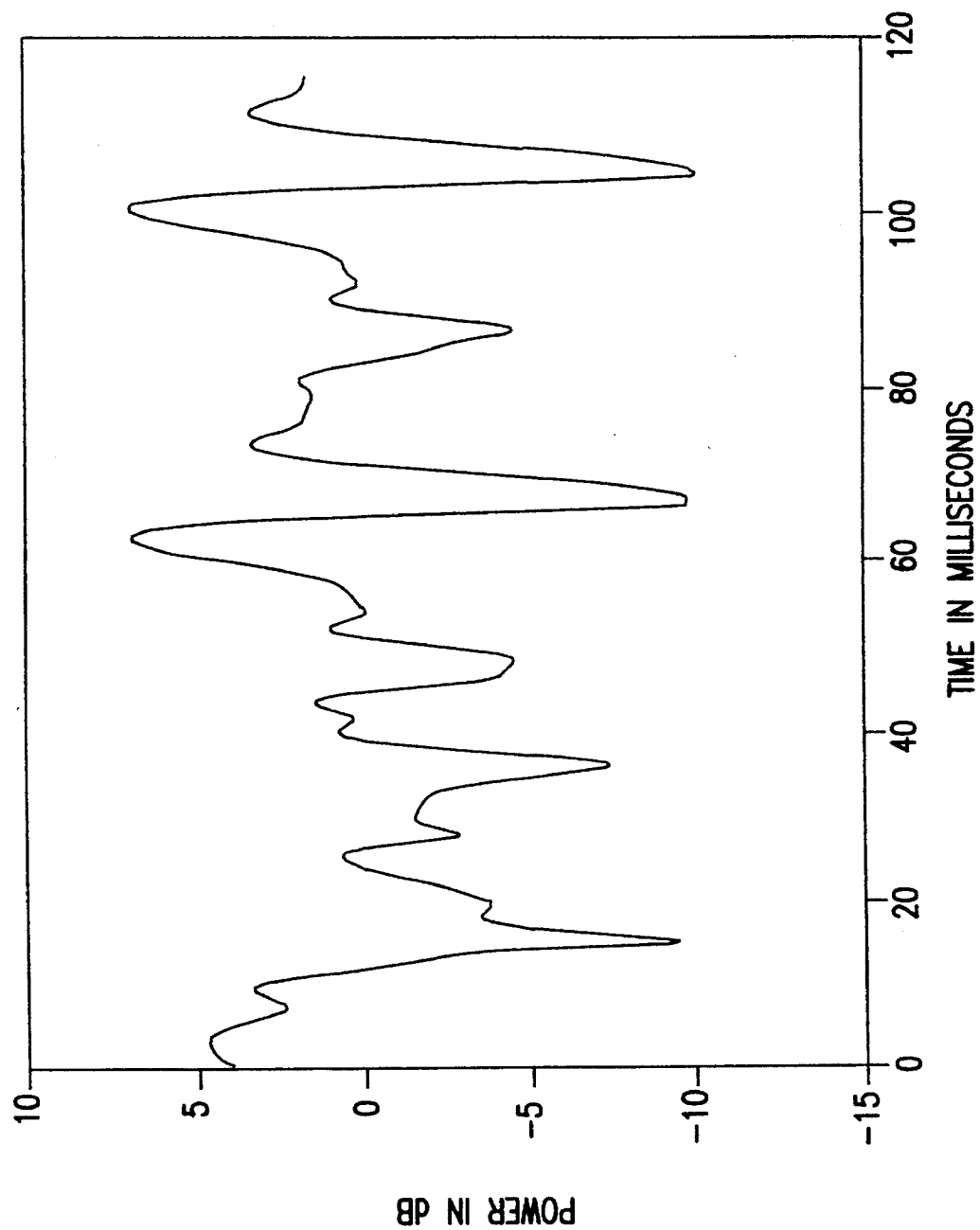
FIG. 7 illustrates during transmission time.
Figure 8:
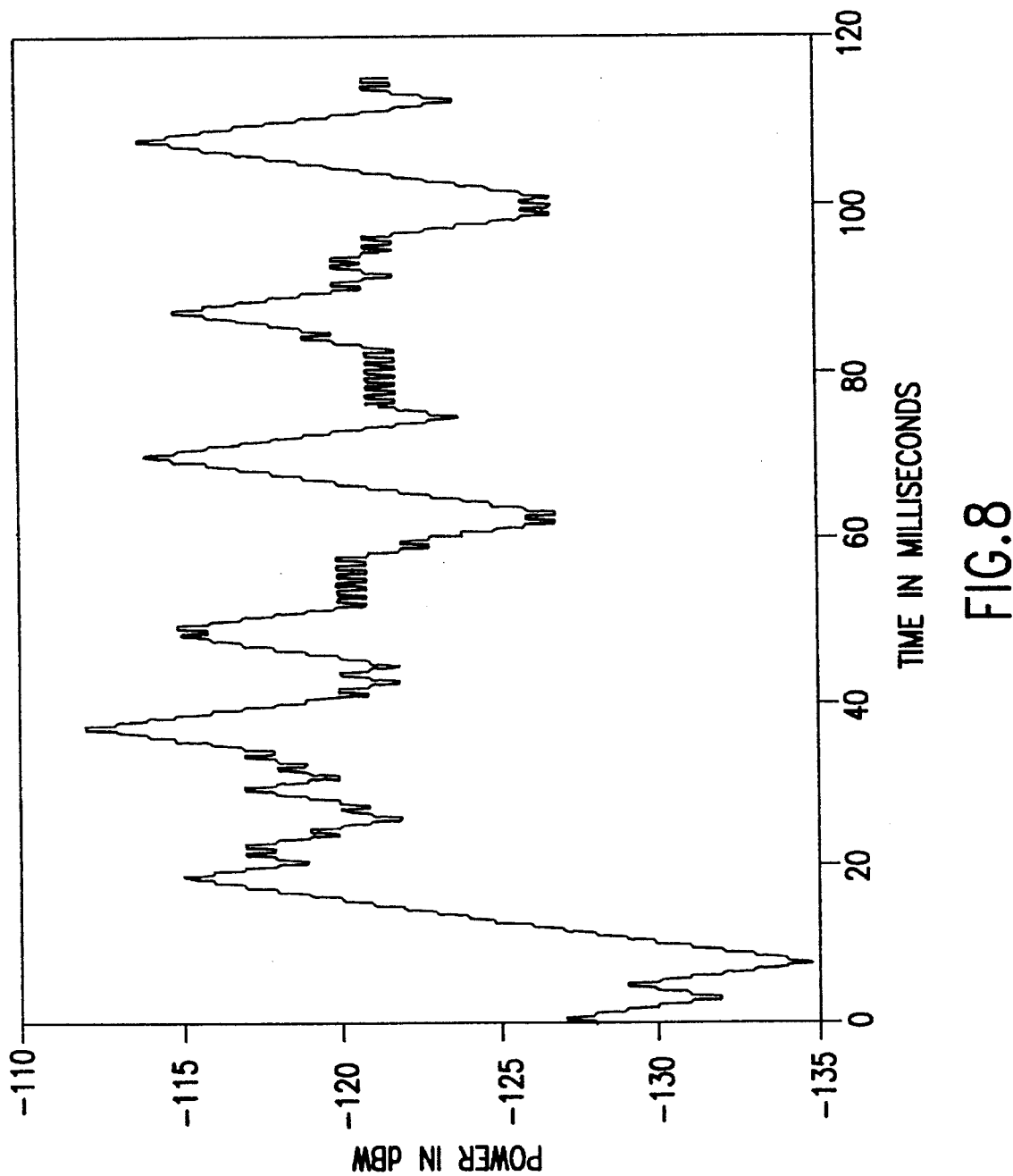
FIGS. 8 and 9 illustrate adaptive power control signal, the broadcast power, for fixed step algorithm.
Figure 9:
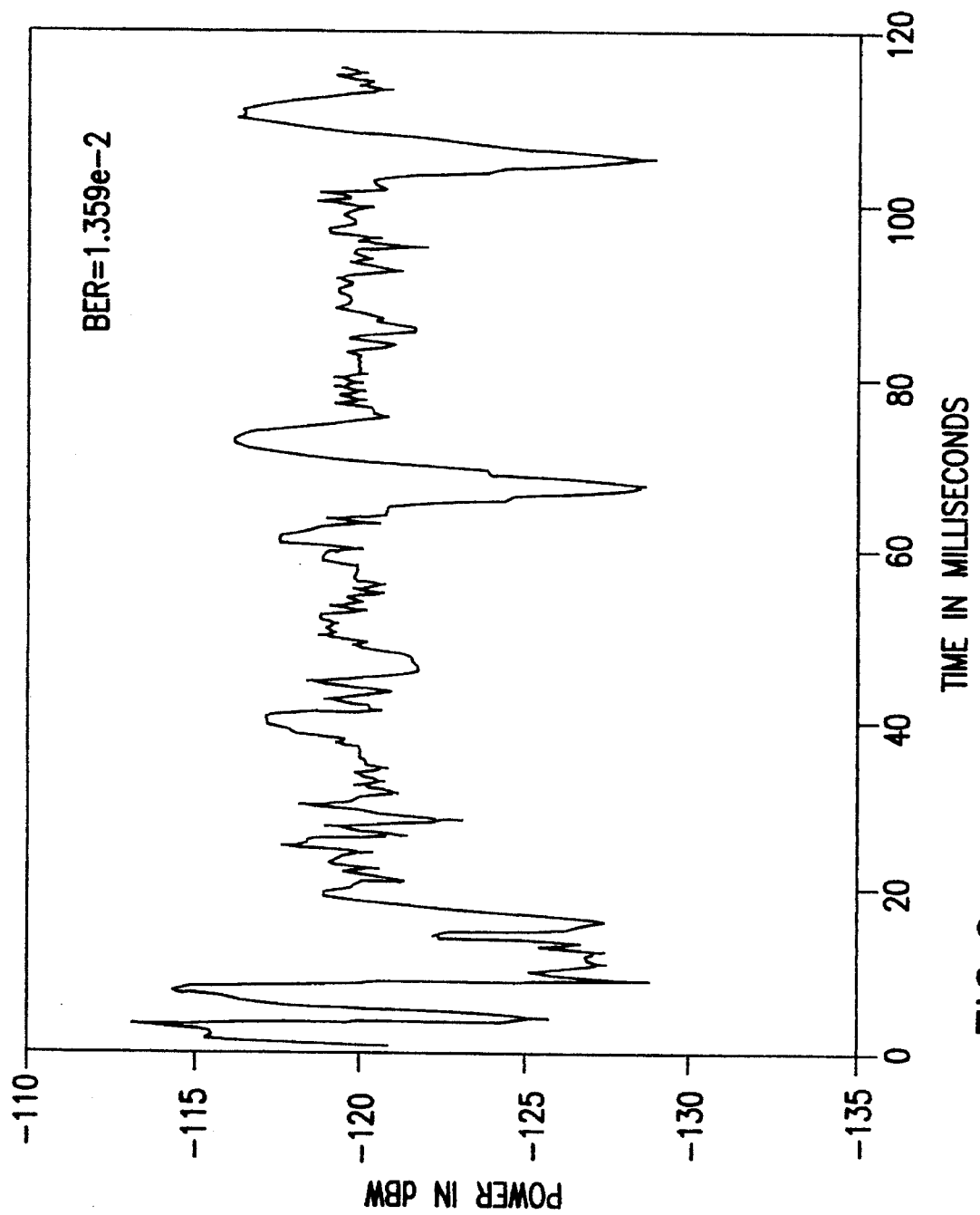

FIG. 7 shows a typical fading signal which is received at the base station along with ten other independently fading signals and thermal noise having the same power as one of the signals. Note that the fade duration is about 5 milliseconds which corresponds to vehicular speed exceeding 60 miles per hour. FIGS. 8–9 illustrate the results obtained when using a particular adaptive power control algorithm. In this case, whenever the received signal changes power, the base station informs the remote and the remote varies its power by ±1 dB. FIG. 8 shows the adaptive power control signal at the remote station. FIG. 9 shows the received power at the base station. Note that the adaptive power control track the deep fades and as a result a 9 dB fades resulted. This reduced power level resulted in a bit error rate of $1.4 \times 10^{-2}$.

Figure 10:
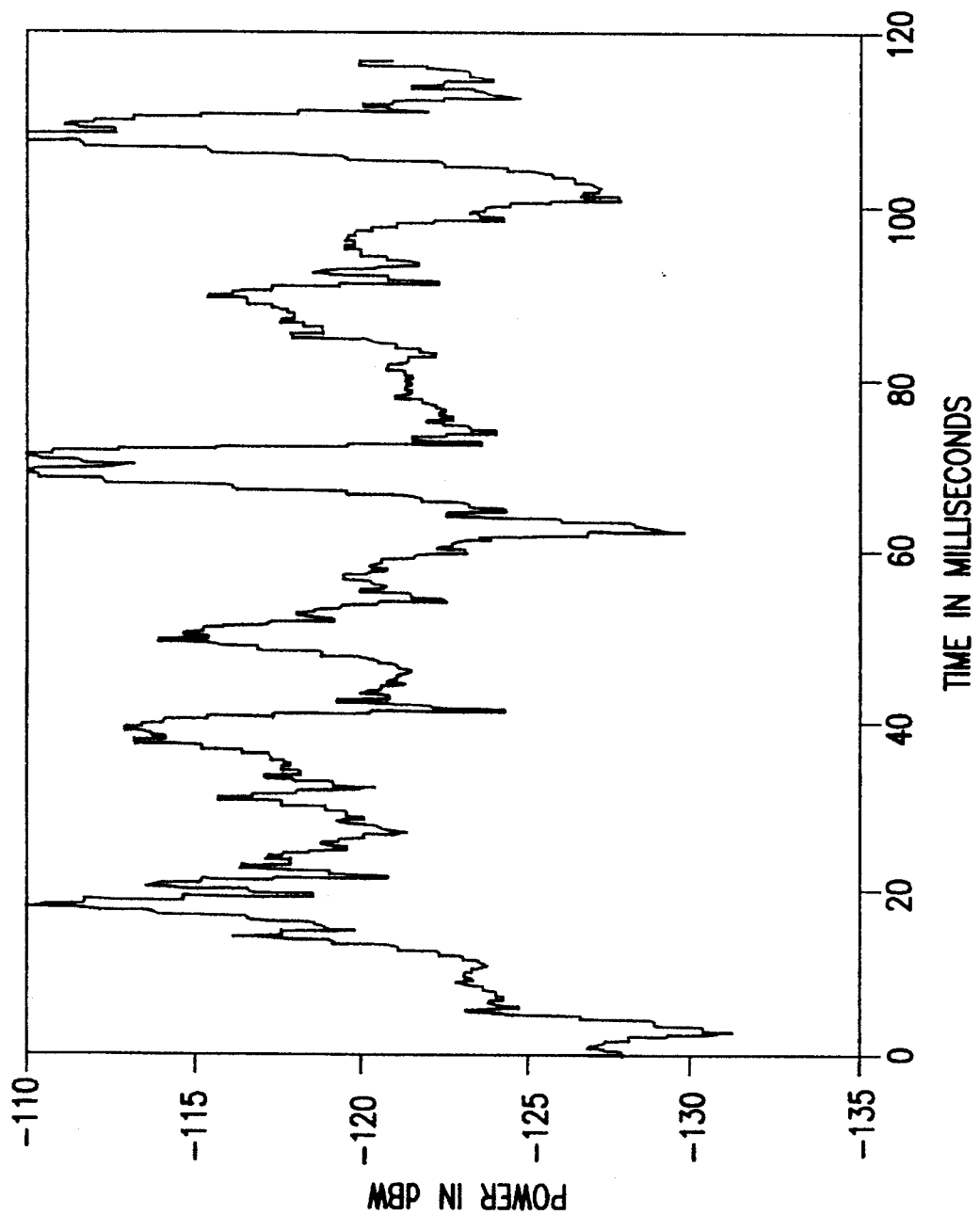
FIG. 10 and 11 illustrate adaptive power control signal, the broadcast signal, for variable step algorithm.
Figure 11:
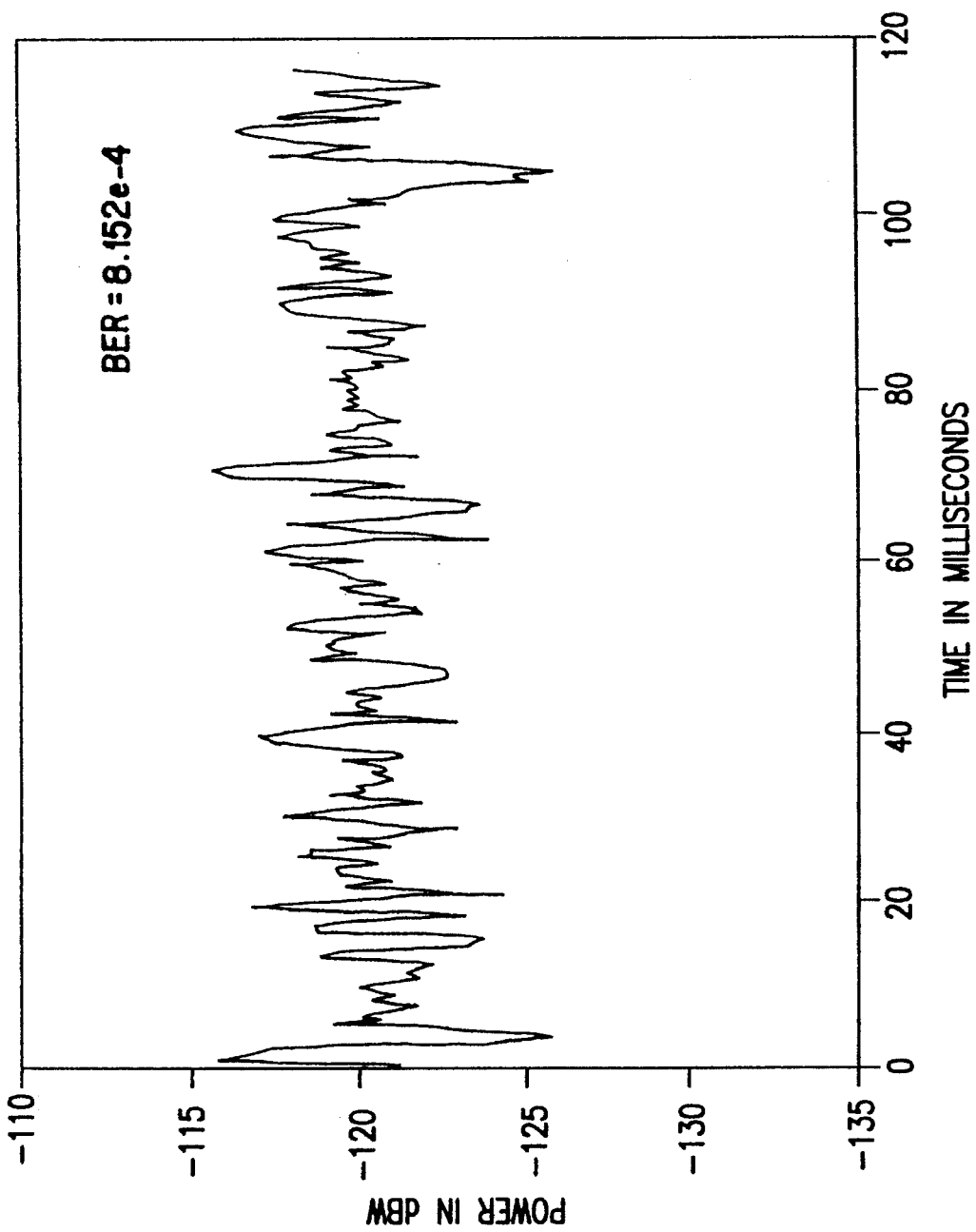

For the same fade of FIG. 7, assume a different adaptive power control algorithm is employed. In this case the control voltage results in the remote unit changing its power by a factor of 1.5 in the same direction, or by a factor of 0.5 in the opposite direction. In this particular implementation the minimum step size was 0.25 dB and the maximum step size was 4 dB. The resulting control voltage is shown in FIG. 10 and the resulting received power from the remote unit is shown in FIG. 11. Note that the error is usually limited to ±2 dB with occasional decreases in power by 5 dB to 6 dB resulting in a BER$\approx 8 \times 10^{-4}$, a significant improvement compared to the previous algorithm. The use of interleaving and forward error correcting codes usually can correct any errors resulting from the rarely observed power dips.

It will be apparent to those skilled in the art that various modifications can be made to the method and apparatus for adaptively controlling a power level of a spread-spectrum signal in a cellular environment of the instant invention without departing from the scope or spirit of the invention, and it is intended that the present invention cover modifications and variations of the method and apparatus for adaptively controlling a power level of a spread-spectrum signal in a cellular environment provided they come in the scope of the appended claims and their equivalents.

I claim:

1. A system for adaptive-power control of a spread-spectrum transmitter of a mobile station operating in a cellular-communications network using spread-spectrum modulation, comprising:

said mobile station having a mobile transmitter coupled to a mobile antenna for transmitting a first spread-spectrum signal using radio waves;

a base station having
an automatic-gain-control (AGC) circuit, responsive to a received signal, for generating an AGC-output signal, with the received signal including the first spread-spectrum signal and an interfering signal;

a base correlator coupled to said AGC circuit for despreading the AGC-output signal;

a power-measurement circuit coupled to said base-correlator, for processing the despread AGC-output signal as a received-power level;

a comparator coupled to said power-measurement circuit for generating a comparison signal by comparing the received-power level to a threshold level;

a power-command circuit coupled to said comparator and responsive to the comparison signal for generating a power-command signal;

an antenna;

a transmitter coupled to said antenna and to said power-command circuit for transmitting the power-command signal as a second spread-spectrum signal; and said mobile station further including
a mobile correlator coupled to said mobile antenna for despreading the power-command signal from the second spread-spectrum signal as a power-adjust signal; and a variable-gain device coupled to said mobile correlator, responsive to the power-adjust signal indicating an increase in power necessary to reach a desired power level, for geometrically increasing a transmitter-power level of the first spread-spectrum signal transmitted from said mobile-transmitter until the transmitter-power level exceeds the desired power level and then for geometrically decreasing the transmitter-power level of the first spread-spectrum signal until the transmitter-power level falls below the desired power level, said variable-gain device alternatingly geometrically increasing to a point of excess power and geometrically decreasing to a point of insufficient power, with diminishing margins of error in excess and insufficiency, until the desired power level is obtained.

2. The system as set forth in claim 1 with said power-measurement circuit coupled to said AGC circuit and to said base-correlator, responsive to processing the received signal with the despread AGC-output signal, for generating the received-power level.

3. The system as set forth in claim 1 or 2 with said variable-gain device, responsive to the power-adjust signal indicating a decrease in power necessary to reach the desired power level, for geometrically decreasing the transmitter-power level of the first spread-spectrum signal transmitted from said mobile-transmitter until the transmitter-power level falls below the desired power level and then for geometrically increasing the transmitter-power level of the first spread-spectrum signal until the transmitter-power level exceeds the desired power level, said variable-gain device alternatingly geometrically decreasing to a point of insufficient power and geometrically increasing to a point of excess power, with diminishing margins of error in insufficiency and excess, until the desired power level is obtained.

4. A system for adaptive-power control of a spread-spectrum transmitter of a mobile station operating in a cellular-communications network using spread-spectrum modulation, with the mobile station transmitting a first spread-spectrum signal, said system comprising:

a base station;

automatic gain control (AGC) means, located at said base station, responsive to a received signal, with the received signal including the first spread-spectrum signal and an interfering signal, for generating an AGC-output signal;

base-correlator means, located at said base station, for despreading the AGC-output signal as a despread AGC-output signal;

power means, located at said base station, for processing the despread AGC-output signal as a received-power level, and for generating a power-command signal by comparing the received-power level to a threshold level;

transmitter means, located at said base station, for transmitting the power-command signal as a second spread-spectrum signal;

a mobile station;

mobile means, located at said mobile station, for despreading the power-command signal from the second spread-spectrum signal as a power-adjust signal; and variable-gain means, located at said mobile station, responsive to said power-adjust signal indicating an increase in power necessary to reach a desired power level, for geometrically increasing a transmitter-power level of the first spread-spectrum signal until the transmitter-power level exceeds the desired power level and then for geometrically decreasing the transmitter-power level of the first spread-spectrum signal until the transmitter-power level falls below the desired power level, said variable-gain means alternatingly geometrically increasing to a point of excess power and geometrically decreasing to a point of insufficient power, with diminishing margins of error in excess and insufficiency, until the desired power level is obtained.

5. The system as set forth in claim 4 with said power means responsive to processing the received signal with the despread AGC-output signal, for generating the received-power level.

6. The system as set forth in claim 4 with said variable-gain means, responsive to the power-adjust signal indicating a decrease in power necessary to reach the desired power level, for geometrically decreasing the transmitter-power level of the first spread-spectrum signal transmitted from said mobile-transmitter until the transmitter-power level falls below the desired power level and then for geometrically increasing the transmitter-power level of the first spread-spectrum signal until the transmitter-power level exceeds the desired power level, said variable-gain means alternatingly geometrically decreasing to a point of insufficient power and geometrically increasing to a point of excess power, with diminishing margins of error in insufficiency and excess, until the desired power level is obtained.

7. The system as set forth in claim 5 with said variable-gain means, responsive to the power-adjust signal indicating a decrease in power necessary to reach the desired power level, for geometrically decreasing the transmitter-power level of the first spread-spectrum signal transmitted from said mobile-transmitter until the transmitter-power level falls below the desired power level and then for geometrically increasing the transmitter-power level of the first spread-spectrum signal until the transmitter-power level exceeds the desired power level, said variable-gain means alternatingly geometrically decreasing to a point of insufficient power and geometrically increasing to a point of excess power, with diminishing margins of error in insufficiency and excess, until the desired power level is obtained.

8. The system as set forth in claim 4, 5, 6 or 7 with said base-correlator means including:

a first chip-code generator;

a first bandpass filter; and a first product device coupled to said first chip code generator and said first bandpass filter.

9. The system as set forth in claim 4, 5, 6 or 7 with said base-correlator means including a differential amplifier.

10. The system as set forth in claim 4, 5, 6 or 7 with said AGC means including an automatic-gain-control circuit.

11. The system as set forth in claim 4, 5, 6 or 7 with said variable-gain means including a variable-gain attenuator for adjusting the transmitter-power level.

12. The system as set forth in claim 4, 5, 6 or 7 with said variable-gain means including a variable-gain amplifier for adjusting the transmitter-power level.

13. The system as set forth in claim 4, 5, 6 or 7 with said power means including means for multiplying the received signal with the despread AGC-output signal for generating the received-power level.

14. The system as set forth in claim 4, 5, 6 or 7 with said power means including logarithmic means for adding the received signal with the despread AGC-output signal for generating the received-power level.

15. A method for adaptive-power control, from a base station, of a spread-spectrum transmitter of a mobile station operating in a cellular-communications network using spread-spectrum modulation, with the mobile station transmitting a first spread-spectrum signal, said method comprising the steps of:

generating, at said base station, from a received signal, with the received signal including the first spread-spectrum signal and an interfering signal, an AGC-output signal;

despreading, at said base station, the AGC-output signal as a despread AGC-output signal;

processing, at said base station, the despread AGC-output signal to generate a received-power level;

generating, at said base station, a power-command signal from comparing the received-power level to a threshold;

transmitting, from said base station, the power-command signal as a second spread-spectrum signal;

despreading, at said mobile station, the power-command signal from the second spread-spectrum signal as a power-adjust signal;

geometrically increasing, at said mobile station, responsive to the power-adjust signal indicating a transmitter-power level less than a desired power level, the transmitter-power level of the first spread-spectrum signal until the transmitter-power level exceeds the desired power level;

geometrically decreasing the transmitter-power level of the first spread-spectrum signal until the transmitter-power level falls below the desired power level; and repeating the steps of geometrically increasing and geometrically decreasing, with diminishing margins of error in insufficiency and excess, until the desired power level is obtained.

16. The method as set forth in claim 15 with the step of processing, at said base station, including the step of processing the received signal with the despread AGC-output signal, for generating the received-power level.

17. The method as set forth in claim 15 or 16, further comprising the steps of:

geometrically decreasing, at said mobile station, responsive to the power-adjust signal indicating a transmitter power level greater than a desired power level, the transmitter-power level of the first spread-spectrum signal until the transmitter-power level falls below the desired poker level;

geometrically increasing the transmitter-power level of the first spread-spectrum signal until the transmitter-power level exceeds the desired power level; and repeating the steps of geometrically decreasing and geometrically increasing, with diminishing margins of error in excess and insufficiency, until the desired power level is obtained.

18. A method for adaptive-power control, from a base station, of a spread-spectrum transmitter of a mobile station operating in a cellular-communications network using spread-spectrum modulation, with the mobile station transmitting a first spread-spectrum signal, said method comprising the steps of:

generating, at said base station, from a received signal, with the received signal including the first spread-spectrum signal and an interfering signal, an AGC-output signal;

despreading, at said base station, the AGC-output signal as a despread AGC-output signal;

processing, at said base station, the despread AGC-output signal to generate a received-power level;

generating, at said base station, a power-command signal from comparing the received-power level to a threshold;

transmitting, from said base station, the power-command signal as a second spread-spectrum signal;

despreading, at said mobile station, the power-command signal from the second spread-spectrum signal as a power-adjust signal;

increasing, responsive to the power-adjust signal indicating a transmitter-power level less than a desired power level, the transmitter-power level in non-linear increments until the transmitter-power level exceeds the desired power level;

decreasing the transmitter-power level in non-linear increments until the transmitter-power level falls below the desired power level; and repeating the steps of increasing the transmitter-power level in non-linear increments to a point of excess power and decreasing the transmitter-power level in non-linear increments to a point of insufficient power, with diminishing margins of error in excess and insufficiency, until the desired power level is obtained.

19. The method as set forth in claim 18, further comprising the steps of:

decreasing, responsive to the power-adjust signal indicating a transmitter-power level greater than a desired power level, the transmitter-power level in non-linear increments until the transmitter-power level falls below the desired power level;

increasing the transmitter-power level in non-linear increments until the transmitter-power level exceeds the desired power level; and repeating the steps of decreasing the transmitter-power level in non-linear increments to a point of insufficient power and increasing the transmitter-power level in non-linear increments to a point of excess power, with diminishing margins of error in insufficiency and excess, until the desired power level is obtained.

20. The system as set forth in claim 1, with said variable-gain device, responsive to the power-adjust signal indicating an increase in power necessary to reach a desired power level, for increasing in non-linear increments a transmitter-power level of the first spread-spectrum signal transmitted from said mobile-transmitter until the transmitter-power level exceeds the desired power level, and then for decreasing in non-linear increments the transmitter-power level of the first spread-spectrum signal until the transmitter-power level falls below the desired power level, said variable-gain device alternatingly increasing the transmitter-power level to a point of excess power and decreasing the transmitter-power level to a point of insufficient power, with diminishing margins of error in excess and insufficiency, until the desired power level is obtained.

21. The system as set forth in claim 1 with said variable-gain device, responsive to the power-adjust signal indicating a decrease in power necessary to reach the desired power level, for decreasing in non-linear increments the transmitter-power level of the first spread-spectrum signal transmitted from said mobile-transmitter until the transmitter-power level falls below the desired power level and then for increasing in non-linear increments the transmitter-power level of the first spread-spectrum signal until the transmitter-power level exceeds the desired power level, said variable-gain device alternatingly decreasing the transmitter-power level to a point of insufficient power and increasing the transmitter-power level to point of excess power, with diminishing margins of error in insufficiency and excess, until the desired power level is obtained.

* * * * *

UNITED STATES PATENT AND TRADEMARK OFFICE
CERTIFICATE OF CORRECTION

PATENT NO. : 5,535,238
DATED : Jul. 9, 1996
INVENTOR(S) : Donald L. Schilling, et al It is certified that error appears in the above-identified patent and that said Letters Patent is hereby corrected as shown below:

On the title page, the data in item [63] Related U.S. Application Data, should be deleted and substitute therefor:

--Continuation of Ser. No. 792,869, Nov. 19, 1991, Pat. No. 5,299,226, which is a continuation-in-part of Ser. No. 614,816, Nov. 16, 1990, Pat. No. 5,093,840--

Column 1, delete lines 7-9, and substitute therefor:

--This application is a continuation of application Ser. No. 07/792,869, Filed Nov. 19, 1991, which is now U.S. Pat. No. 5,299,226, issued March 29, 1994, which is a continuation-in-part of U.S. patent application Ser. No. 07/614,816, filed Nov. 16, 1990, now U.S. Pat. No. 5,093,840, issued March 3, 1992.--

Signed and Sealed this

Sixteenth Day of June, 1998

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,535,238
DATED : Jul. 9, 1996
INVENTOR(S) : Donald L. Schilling, et al It is certified that error appears in the above-identified patent and that said Letters Patent is hereby corrected as shown below:

On the title page, the data in item [63] Related U.S. Application Data, should be deleted and substitute therefor:

--Continuation-in-part of Ser. No. 792,869, Nov. 19, 1991, Pat. No. 5,299,226, which is a continuation-in-part of Ser. No. 614,816, Nov. 16, 1990, Pat. No. 5,093,840--

Column 1, delete lines 7-9, and substitute therefor:

--This application is a continuation-in-part of application Ser. No. 07/792,869, Filed Nov. 19, 1991, which is now U.S. Pat. No. 5,299,226, issued March 29, 1994, which is a continuation-in-part of U.S. Patent application Ser. No. 07/614,816, filed Nov. 16, 1990, now U.S. Pat. No. 5,093,840, issued March 3, 1992.--

This certificate supersedes Certificate of Correction issued June 16, 1998.

Signed and Sealed this

Fifteenth Day of December, 1998

*Attest:*

*Attesting Officer*

BRUCE LEHMAN

*Commissioner of Patents and Trademarks*